J. KREUER, Jr.
SANITARY CONNECTING DEVICE.
APPLICATION FILED JUNE 12, 1915.

1,206,444.

Patented Nov. 28, 1916.

WITNESSES
W. T. Hofman
G. H. Leresche

INVENTOR
Joseph Kreuer Jr.

UNITED STATES PATENT OFFICE.

JOSEPH KREUER, JR., OF PITTSBURGH, PENNSYLVANIA.

SANITARY CONNECTING DEVICE.

1,206,444.  Specification of Letters Patent.  Patented Nov. 28, 1916.

Application filed June 12, 1915.  Serial No. 33,801.

*To all whom it may concern:*

Be it known that I, JOSEPH KREUER, Jr., a resident of Pittsburgh, in the county of Allegheny and State of Pennsylvania, have invented a new and useful Improvement in Sanitary Connecting Devices, of which the following is a specification.

This invention relates to a sanitary connecting device, and particularly to a device for connecting the tap of a barrel containing malt liquors to the air line supplying pressure to the barrel.

In order that malt liquors such as beer, ale and porter may be readily drawn from the barrel, it is customary to connect the barrel to a suitable source of fluid pressure, preferably to an air compressor by means of piping or tubing known as the air line. At times when the air compressor is not acting, the liquor in the barrel will tend to back up into the air line. A rubber nipple is usually provided at the joint between the air line and tap to prevent this action, but this nipple quickly becomes corroded and foul and is ineffectual in preventing vapors from the liquor entering the air line, where they condense into strings of slime usually known as "snakes". If the nipple mentioned is not frequently changed and the air line cleared the flavor of the liquor becomes materially affected and the slime may even be drawn into the barrel. It has previously been the practice to connect the air line directly to the tap of the barrel and in such case it is impossible to disconnect the air line for cleansing the same or for renewing the nipple without loss of the pressure within the barrel and of a certain amount of the liquor.

The object of the present invention is to provide a device for connecting the air line and tap which will permit the air line to be blown out or flushed without disconnecting the same from the tap, and which also permits ready access to the nipple without disconnecting the air line at any point. A further object of the invention is to provide a connection which supplies pressure from the air line to the barrel through a circuitous passage so that the slight amount of pressure remaining in the passages of the connection is enabled to act as an additional safeguard for preventing back flow of fluid from the barrel into the air line.

The invention comprises the construction and arrangement of parts as hereinafter described and claimed.

Figure 1:
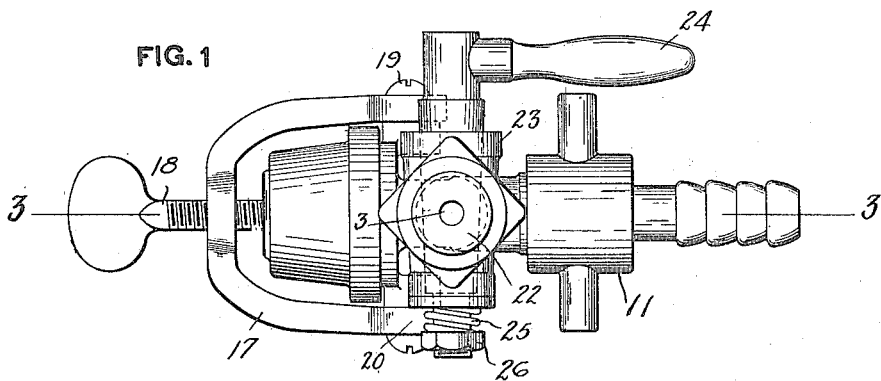
Figure 2:
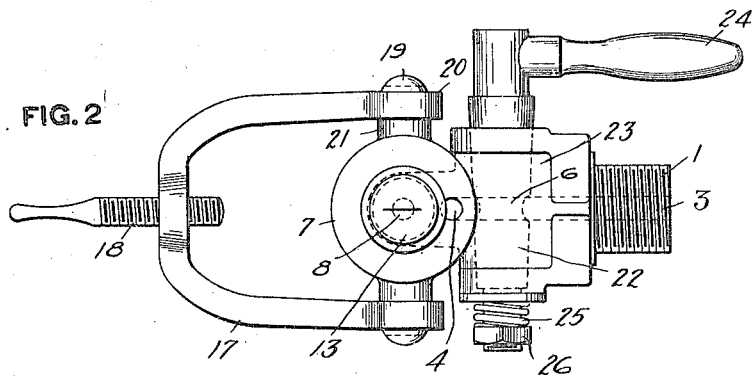
Figure 3:
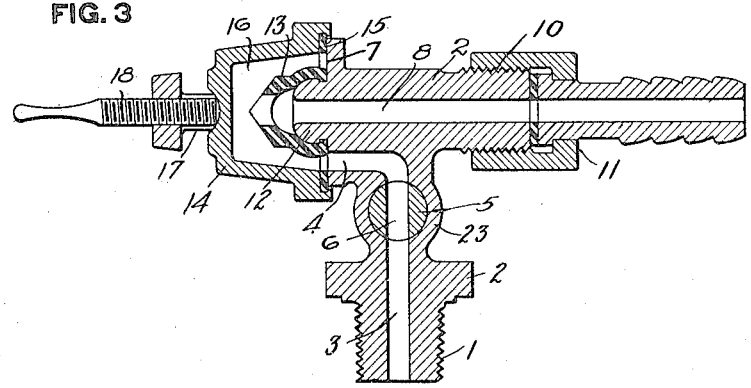

In the accompanying drawings Figure 1 is a side elevation of the device; Fig. 2 is an end elevation of the same with the cap for connecting the air passages removed; and Fig. 3 is a horizontal section through the device on the line 3—3 Fig. 1.

The connection is joined to the barrel tap by means of the screw threaded plug 1 which is preferably slightly tapered to insure a tight engagement irrespective of wearing of the threads. Extending longitudinally through the plug 1 and casing member 2, is a passage 3, which is arranged to be connected to or disconnected from a passage 4 extending at right angles thereto, by means of a cock 5 provided with a through port 6. Passage 4 opens at a face 7 from which leads a passage 8 through casing member 2, and which is arranged to be connected in any suitable manner to the air line, but which is shown as connected thereto by being screw threaded at 10 to a union 11. Surrounding the mouth of passage 8 is a boss 12 on face 7 of the casing, arranged to receive a suitable rubber nipple 13 for preventing back flow of liquid into the air line. In normal operative use of the device the hollow cap 14 provided with a suitable air tight gasket 15 abuts against the face 7 and acts as a closure for the same. This cap 14 is constructed with an internal chamber 16 of such diameter that when the cap is in position on the face 7 the chamber 16 includes the orifices of the passages 4 and 8 and affords free communication therebetween. The cap 14 is secured in position by means of a yoke 17 in which is threaded a set screw 18 arranged to bear against the outer surface of the cap 14. Yoke 17 is pivoted on bolts or pins 19 passing through eyes 20 on the yoke and lugs 21 on the casing 2 of the connection. The yoke 17 may thus be swung into position to bring the screw 18 to bear against cap 14, or may be swung to one side to permit ready removal of the cap.

It is to be noted that the projection of the nipple 13 into the chamber 16 in the cap and the space thus provided in the chamber around the nipple permits vapors to condense in the chamber 16 without danger of the resulting liquid or viscous substance being forced through the nipple into the air line.

The cock 5 in the passage 3 of the connection comprises a tapered plug 22 rotatable in a correspondingly shaped seat in a tubular portion 23 of the casing 2, an actuating handle 24, and a coiled spring 25 bearing against a nut 26 on the plug 22 and against the under surface of the tubular portion 23 for holding the plug closely to its seat.

In normal position of the connecting device for permitting the passage of pressure from the air line into the barrel, the cap 14 is secured to the outer face 7 of the body 2 of the device by means of yoke 17 and set screw 18, and the cock 5 is in position to connect passages 3 and 4 by means of the through port 6 therein. Pressure can thus pass from the air line through passage 8 and nipple 13 into the chamber 16 in the cap and can pass thence through passage 4, port 6, and passage 3 into the barrel tap. When it is desired to change the nipple 13 or cleanse the air line, cock 5 is turned to cut off communication between the passages 3 and 4 thereby cutting off the air line from the barrel. The set screw is loosened and the yoke 17 swung to one side to permit the entire removal of the cap 14. The nipple 13 may then be removed and the air line be blown out or flushed without breaking or loosening the connection with the barrel. In addition to the sanitary advantages above mentioned the connection described permits the ready disengagement of a barrel from the air line to which it is attached, for changing the location of the barrel.

It is obvious that the pipe connection above described may be utilized for a number of purposes other than that indicated and since numerous changes may obviously be made in the form and location of the parts without departing from the spirit of the invention, no limitations other than those contained in the claims are to be imposed.

What I claim is:—

1. A connecting device comprising a body member having a face thereon and provided with a plurality of passages leading from the exterior of said member at different portions thereof and opening through said face, a boss on said face and surrounding one of said passages, a one-way nipple upon said boss, and a removable cap arranged to be secured to said face and connect said passages.

2. A tap connection comprising a member having a portion provided with a passage and arranged to be connected to a barrel tap, a portion arranged to be connected to a source of fluid pressure and having a through passage opening at its other extremity to the atmosphere, and means arranged to close said second named passage from the atmosphere and open communication between it and said first named passage.

3. A tap connection comprising a member having a portion arranged to be connected to a barrel tap and provided with a passage leading thereto, a portion arranged to be connected to a source of fluid pressure and having a through passage opening at its other extremity to the atmosphere, and means arranged to cut off said pressure passage from the atmosphere and place it in communication with the passage leading to said tap.

4. A tap connection comprising a member having a portion arranged to be connected to a barrel tap and provided with a passage leading thereto, a portion arranged to be connected to a source of fluid pressure and having a through passage opening at its other extremity to the atmosphere, means arranged to cut off said pressure passage from the atmosphere and place it in communication with the passage leading to said tap, and independent means for closing said last named passage.

5. A connecting device comprising a member provided with a passage extending through one portion thereof and a passage having an opening through another portion of said member, and means arranged to permit communication between said first named passage and the atmosphere or to close it to the atmosphere and connect it to said second named passage.

6. A connecting device comprising a member provided with a passage extending through one portion of said member, means arranged to permit communication between said first named passage and the atmosphere or to close said passage from the atmosphere and connect it to said second named passage, and independent means for closing said second passage.

In testimony whereof, I have hereunto set my hand.

JOSEPH KREUER, Jr.

Witnesses:
J. B. CROMER,
WILLIAM V. KREUER.

Copies of this patent may be obtained for five cents each, by addressing the "Commissioner of Patents, Washington, D. C."